March 27, 1962

W. H. WEST 3,027,527

SEALED VARIABLE IMPEDANCE DEVICE

Filed June 17, 1959

INVENTOR.
Warren H. West
BY
Roberts, Cushman & Grover
ATT'YS 3,027,527

SEALED VARIABLE IMPEDANCE DEVICE

Warren H. West, Seabrook Beach, N.H., assignor to Cambridge Thermionic Corporation, Cambridge, Mass., a corporation of Massachusetts Filed June 17, 1959, Ser. No. 821,004
6 Claims. (Cl. 336—90)

The field of this invention is that of variable impedance devices, and the invention relates, more particularly, to adjustable impedance devices intended for mounting on panels or similar supports.

Objects of this invention are to provide a variable-impedance device which is fully protected against moisture and other external matter; to provide a variable-impedance device of this type which is adjustable by linear non-rotating movement of a tuning element; to provide such a sealed variable impedance device which is particularly suited for so-called miniaturizing; to provide a sealed variable-impedance device whose impedance is not subject to random variations caused by shock or vibration; and to provide such a device which is strong and reliable and yet inexpensive to manufacture.

The nature and substance of the sealed variable impedance device provided by this invention can be briefly summarized as comprising a tubular conductive impedance element; a tuning element which is adapted for axial movement within the tubular element and which has a threaded spindle axially extending therefrom; a housing having an open recess with a bottom having a passage for the tuning element spindle; a shaft which is rotatably mounted within the housing recess, extends from the open end of the recess, and has an axial, threaded bore engaging the threaded spindle of the tuning element; gasket means between the shaft and the recess wall for sealing the housing; and spring means for biasing the shaft to locate it relatively to and end of the recess.

Turning of the shaft linearly moves the tuning element spindle within the shaft bore and hence the tuning element within the dielectric body for varying the impedance of the device. Since the shaft is operated by rotational movement alone, even though the tuning element is thereby moved linearly, the said gasket means are fully effective in sealing the device. The biasing spring means prevents inadvertent movement of the shaft in response to shock or vibration, but permit rotation of the shaft for intentional adjustment.

In the preferred embodiment of the invention, the shaft is provided with annular shoulder means which, when the shaft is fitted within its mounting recess, abuts against the bottom of the recess or against a rim or edge rolled or swaged inwardly over the shoulder for captivating the shaft therein. In the preferred embodiment, a coil spring is disposed on the shaft to bear against the sealing gasket means and the shaft shoulder means, and the bottom of the recess, respectively, for biasing the shaft to the rolled over end of this recess.

These and other objects and aspects of novelty will appear from the following description of practical embodiments of the invention.

The description refers to drawings in which.

Figure 1:
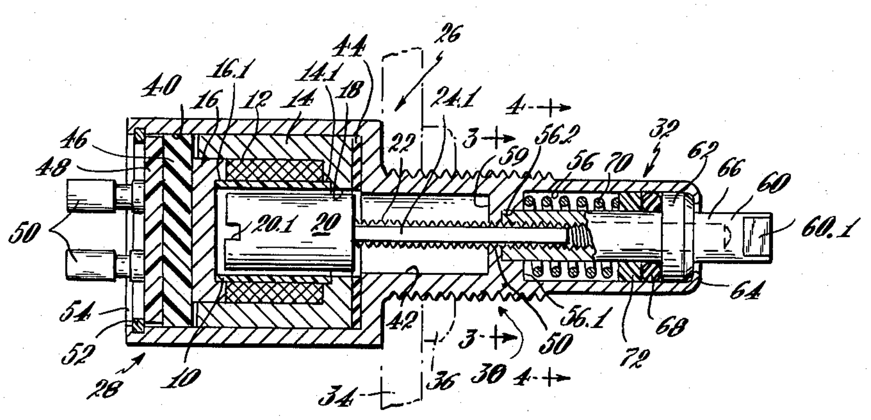
FIG. 1 is a section view along the longitudinal axis of the preferred embodiment of the device according to the invention.
Figure 2:
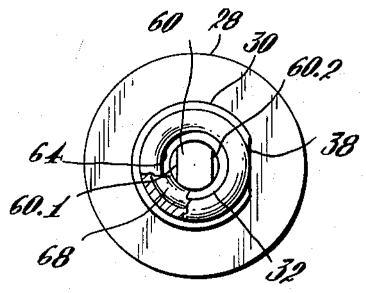
FIG. 2 is an end elevation seen from the right-hand side of FIG. 1.

In FIG. 1, numeral 10 indicates a tubular dielectric body or coil form upon which impedance means, here shown as an inductance coil 12, is wound or otherwise mounted. The dielectric body can be of glass, plastic, ceramic or other material having suitable insulating and shape-retaining properties, and the coil 12 is wound of lacquered or otherwise insulated wire. It will be understood that the insulating coil form is not absolutely necessary and that the impedance element such as 12 can be self-supporting. The mounted coil 12 is enclosed within a cup-shaped, magnetic-shielding member 14, made, for example, of pyroferric material, and further enclosed by a shielding cover 16 of similar material. The cup-shaped member 14 is apertured at 18 to permit access to the center of the tubular body 10, and the shielding members are recessed at 14.1 and 16.1 respectively, for closely positioning the form 10 therein.

A tuning element or core 20, adapted to slide along the axis of the tubular body 10, is provided for adjusting the impedance effected by the coil 12. This tuning element is suitably attached to an axially-extending, threaded, adjusting spindle 22 which has a pair of flats 24.1 and 24.2 longitudinally extending along opposite sides thereof, serving as a rotation-preventing surface means. The tuning element or core is preferably made of powdered iron formed on a machined spindle 22 in the shape indicated, the slot 20.1 being provided for facilitating the installation of the tuning element as will be described below.

As indicated in FIG. 1, the sealed housing 26, preferably made of aluminum, is of substantially cylindrical shape having a casing portion 28 of relatively large diameter, a central outside threaded portion 30 of intermediate diameter, and an opposite end portion 32 of relatively small diameter. As shown in FIG. 1, this housing can be conveniently installed on an instrument panel, indicated by dotted lines 34, and locked thereon with a nut, indicated by dotted lines 36. The flattended surface 38 on the threaded portion 30 of the housing permits convenient mounting of the device in an instrument panel aperture of corresponding shape with a single wrench means.

The housing 26 is provided with an open, axial, cylindrical casing recess 40 at its larger diameter end 28 for receiving the mounted and shielded coil 12 and the tuning element 20. At the central portion 30 it is provided with a coaxial core recess or cavity 42 open towards 40 and of smaller diameter into which the tuning element can be completely withdrawn from the body 10. The mounted and shielded coil 12 is preferably disposed in its casing 40 seated on a spacer 44 and covered with a second spacer 46, both for example of rubber of similar cushioning material, thereby to reduce vibrations in the device. A terminal board 48, having terminals 50 for the induction coil 12, is held within the casing 40 by the split ring 52, and is sealed therein, for example, with a coating of an epoxy resin 54. The terminal board, the shield cover 16, and the spacer 46 are, of course, suitably apertured in a manner not shown to permit connecting the coil leads to the terminals 50.

Figure 3:
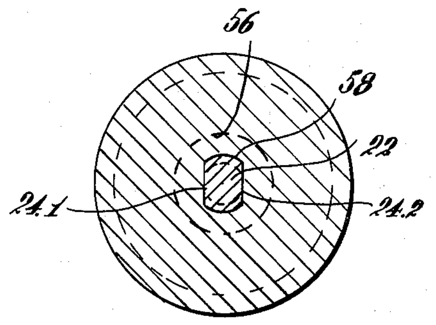
FIG. 3 is a section on line 3—3 of FIG. 1.
Figure 4:
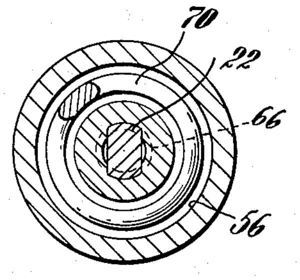
FIG. 4 is a section on line 4—4 of FIG. 1.

The housing 26 is further provided with an open, axial, cylindrical shaft mounting sleeve or recess 56 at its smaller diameter end 32, this recess being connected to the core withdrawing cavity 42 by the coaxial passage 58 through the bottom 59. As shown in FIG. 3, the passage 58 receives the tuning element spindle 22 and substantially corresponds to the cross-section of the spindle, thereby permitting axial movement while preventing rotational movement of the spindle therein.

A shaft 60 having an annular flange 62 is disposed upon assembly placed within the recess 56 through its open end and, thereafter, the recess rim or edge 64 is swaged or rolled inwardly for captivating the flange and shaft therein. The shaft is provided with a blind, axial, threaded bore 66 capable of threadedly engaging the tuning element spindle, and a portion of the shaft, extending from the mounting recess 56, is provided with an actuating portion such as flats 60.1–60.2, engageable by a turning tool. In this construction, rotation of the extending portion of the shaft, for example with a wrench, axially advances or withdraws the tuning element 20 into or from the tubular body 10, since the tuning element spindle cannot rotate in the passage 58. This axial movement adjusts the impedance effected by this device.

An elastic sealing element such as the O-ring gasket 68 is fitted on the shaft 60 within the shaft mounting recess 56 and engages the inner shoulder of the flange 62 and the wall 56.1 of the shaft mounting recess, thereby keeping extraneous matter such as dust and moisture from the recess and the impedance coil 12. A coil spring 70, also fitted around the shaft 60, bears against a thrust ring or washer 72 and against the recess end 56.1 of the bottom 59, thereby biasing the shaft toward one end of its mounting recess and maintaining the gasket tightly in position against the inner flange shoulder. In this manner the shaft is permanently located relatively to the housing and will not respond to shock or vibration to cause disadjustment of the position of the tuning element within the body 10, and therefore the impedance effected by the device will not be inadvertently varied.

In the embodiment of this device according to FIG. 1, the shoulder 62 substantially corresponds in cross-section to the recess 56 so that the shaft will not wobble in the housing. Also, the bottom 59 of the mounting recess 56 is preferably provided with a coaxial bore 56.2 for receiving the threaded bore-end of the shaft, thereby, in cooperation with the shaft shoulder 62, to center the shaft fully in its mounting recess.

Figure 5:
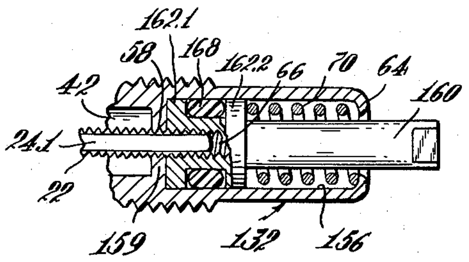
FIG. 5 is a partial section similar to FIG. 1 showing an alternative embodiment of the invention.

In FIG. 5, an alternative embodiment of the device provided by this invention is illustrated. The shaft 160 of this embodiment has two annular flanges 162.1 and 162.2 between which an O-ring gasket 168 is disposed. In this construction, better sealing is provided and the shaft is centered within the recess 156 without reliance upon a centering bore as in the previously described embodiment of this invention.

For the purpose of illustration, this invention has been described as applied to a variable inductance device. However, it should be understood that other variable impedance devices which are adjusted by relative movement of sealed tuning elements are within the scope of this invention, and that this invention includes all modifications and equivalents of the device herein described which fall within the scope of the appended claims.

I claim:

1. In adjustable impedance apparatus with hollow impedance means and a tuning element linearly movable within said hollow means and having an axially-extending threaded portion with a longitudinal non-circular rotation preventing surface, sealing and adjusting means comprising: a housing having a casing recess at one end for enclosing said impedance means and tuning element, having an open recess at its opposite end, and having a passage connecting said casing and open recesses for accommodating said threaded portion of the tuning element, said passage matching said axially-extending portion of the tuning element for permitting axial and preventing rotational movement of said portion therein; a shaft rotatably mounted in said open recess and having an actuating portion axially extending from said open recess, said shaft having a blind, axial, threaded bore for engaging said threaded axially extending portion of the tuning element; and gasket means forming a seal between said shaft and said open recess; whereby the housing is sealed at the open recess and, when the shaft is rotated, the tuning element is linearly moved within the impedance means.

2. A sealed variable impedance device comprising: hollow impedance means; a tuning element axially movable within the impedance means, said tuning element having an axially-extending threaded spindle with a longitudinal flat; a housing having a sealed casing recess at one end for enclosing the impedance means and tuning element, having an open recess at its opposite end, and having a passage connecting said casing and open recesses for accommodating the tuning element spindle, said passage corresponding in cross-section to the spindle for permitting axial and preventing rotational movement of the spindle therein; a shaft having annular flange means and being rotatably mounted in said open recess, the recess rim being swaged inwardly for captivating the shaft therein, said shaft having a portion axially extending from the open recess for engagement by turning means, and having a blind, axial, threaded bore for engaging said tuning element spindle; an elastic ring fitted over the shaft forming a seal between the shaft and its recess; and a coil spring fitted over the shaft for biasing the shaft to one end of said open recess; whereby, when the shaft is rotated, the tuning element will be axially moved within the impedance means for adjusting the impedance effected by the device and a seal is provided at the opening recess of the housing.

3. A sealed variable impedance device according to claim 2, wherein said housing is of substantially cylindrical configuration and includes a casing portion of relatively large diameter, a central, externally-threaded portion of intermediate diameter, and an opposite end portion of relatively small diameter, accommodating said shaft-mounting opening recess; whereby the device can be conveniently mounted on an instrument panel.

4. A sealed variable impedance device according to claim 2, wherein said flange means of said shaft has an annular shoulder against which said elastic ring is normally engaged, and includes a thrust ring fitted over the shaft for engaging the opposite side of the elastic ring, said coil spring being fitted over the shaft to bear against an end of said open recess and the thrust ring respectively, thereby to bias the shaft toward one end of the open recess and to confine the elastic ring between the shaft shoulder and the thrust ring.

5. A sealed variable impedance device according to claim 2, wherein said flange means of said shaft has a pair of shoulders constituting an annular groove wherein said elastic ring is disposed, said coil spring being fitted over the shaft to bear against an end of said open recess and said flange means, respectively, thereby to bias the shaft toward one end of the open recess.

6. A sealed variable impedance device comprising: a tubular conductive impedance element; a tuning element axially movable within the impedance element, said tuning element having a threaded spindle axially extending from the body and having flats extending along opposite sides thereof; a housing having a casing recess for said impedance element and said tuning element, an open recess, and a passage for said spindle connecting the recesses and corresponding in cross-section to the spindle for permitting axial and prevent rotational movement of the spindle therein, the rim of the open recess being turned inwardly; terminal board means for the impedance element, fixed within the casing recess for sealing it; a shaft rotatably mounted in said open recess, having at one end a portion engageable by turning means axially extending from said recess, having at the other end a blind, axial, threaded bore for engaging said spindle, having an intermediate flange which fits said open recess resting with one side on said inwardly turned rim; gasket means disposed within the second housing recess resting against the other side of said flange to form a seal between the shaft and the walls of the open recess; and spring means within the open recess for biasing said shaft toward one end of said recess, said gasket means, said flange and said rim, whereby turning of the shaft will linearly move said tuning element within the dielectric body for varying impedance of the device, a seal is provided at the open recess, the shaft is secured against axial movement, and inadvertent moving of said tuning element is prevented.

References Cited in the file of this patent

UNITED STATES PATENTS

| | | |
|---|---|---|
| 2,578,608 | Shull | Dec. 11, 1951 |
| 2,664,749 | Jones | Jan. 5, 1954 |
| 2,673,933 | Morton | Mar. 30, 1954 |